United States Patent

(12) United States Patent
Qi

(10) Patent No.: US 8,908,744 B1
(45) Date of Patent: Dec. 9, 2014

(54) DISCRIMINATOR SYSTEM FOR TIMING ERROR DETECTION IN PRESENCE AND ABSENCE OF MULTIPATH CONDITIONS

(75) Inventor: Yihong Qi, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 205 days.

(21) Appl. No.: 13/010,162

(22) Filed: Jan. 20, 2011

Related U.S. Application Data

(60) Provisional application No. 61/303,229, filed on Feb. 10, 2010.

(51) Int. Cl.
*H04B 1/00* (2006.01)

(52) U.S. Cl.
USPC ......................................................... 375/149

(58) Field of Classification Search
None
See application file for complete search history.

(56) References Cited

U.S. PATENT DOCUMENTS

| | | | |
|---|---|---|---|
| 5,949,815 A * | 9/1999 | Pon .............................. | 375/150 |
| 6,252,546 B1 * | 6/2001 | Lennen et al. ................ | 342/363 |
| 6,330,273 B1 * | 12/2001 | Hulbert et al. ................ | 375/150 |
| 6,463,091 B1 * | 10/2002 | Zhodzicshsky et al. ...... | 375/149 |
| 6,636,558 B1 * | 10/2003 | Schnaufer et al. ............ | 375/150 |
| 6,744,404 B1 * | 6/2004 | Whitehead et al. ...... | 342/357.61 |
| 6,760,364 B2 * | 7/2004 | Kohli et al. .................... | 375/150 |
| 6,868,110 B2 * | 3/2005 | Phelts et al. .................. | 375/144 |
| 7,301,992 B2 * | 11/2007 | Kohli et al. .................... | 375/150 |
| 7,876,807 B2 * | 1/2011 | Ray et al. ...................... | 375/136 |
| 2002/0077125 A1 * | 6/2002 | Hunzinger .................... | 455/456 |
| 2006/0133461 A1 * | 6/2006 | Sleewaegen ................. | 375/150 |
| 2007/0098055 A1 * | 5/2007 | Raman et al. ................. | 375/150 |
| 2009/0110134 A1 * | 4/2009 | Yuan et al. .................... | 375/371 |
| 2009/0147833 A1 * | 6/2009 | Pietila et al. ................. | 375/147 |
| 2009/0195449 A1 * | 8/2009 | Bedell et al. ............. | 342/357.03 |

* cited by examiner

*Primary Examiner* — Santiago Garcia

(57) ABSTRACT

In a code tracking loop, a multipath discriminator is configured to generate a first tracking error corresponding to a received signal in the presence of multipath interference and/or at low signal level. A line-of-sight (LOS) discriminator is configured to generate a second tracking error corresponding to the received signal. A multipath switch is configured to i) detect the presence of multipath interference in the received signal and/or a low signal level of the received signal compared to a threshold, and ii) indicate whether the first tracking error or the second tracking error is to be utilized.

18 Claims, 5 Drawing Sheets

DISCRIMINATOR SYSTEM FOR TIMING ERROR DETECTION IN PRESENCE AND ABSENCE OF MULTIPATH CONDITIONS

CROSS-REFERENCE TO RELATED APPLICATION

The present disclosure claims the benefit of U.S. Provisional Patent Application No. 61/303,229, entitled "Multipath Discriminator for Code Tracking Loop in a GPS Receiver," filed on Feb. 10, 2010, which is hereby incorporated by reference herein in its entirety.

FIELD OF THE DISCLOSURE

The present disclosure relates generally to timing error estimation in a receive system and, more particularly, to timing error estimation in the presence and absence of multipath interference and/or low signal level.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Global Positioning System (GPS) is a U.S. government-supported system for precise position and velocity determination of objects. Orbiting satellites emit coded radio frequency signals that are received and processed by receivers on or near the surface of the earth to obtain pseudorange measurements, approximate instantaneous distances between the satellites and receiver. Because the satellite orbits and signal transmission times are known precisely, the receipt time of a particular signal bit can be used to quantify the transit time or range to the particular satellite. The orbits of the GPS satellites are arranged in multiple planes so that signals can be received from at least four satellites at any point on or near the earth, allowing precise position and velocity measurements of the receiver. Each satellite continually transmits a spread-spectrum signal that is modulated by a pseudo-random noise (PRN) code unique to the satellite. A receiver can therefore identify and separate signals from each satellite into separate channels, process the channel data separately, and combine the processed data to compute the receiver position. In addition to the PRN code, the signals are modulated by slower-varying data signals defining the satellite orbits and other relevant information needed for the computations. The most common PRN code is a binary sequence of 0's and 1's or −1's and +1's that modulates the carrier phase.

In the receiver, local signals corresponding to the known PRN code are generated and correlated with the received signals. The phases of the local signals are adjusted until the local signals correctly track the received signal. Since the time at which each bit of the code sequence is transmitted from the satellite is known, the time of receipt of each bit is a direct measure of the transmit time of the signal from the satellite to the receiver, and therefore a measure of the distance between the two. Based on the computed relative phase of the received signal, the receiver calculates the desired quantities of distance, velocity, etc.

SUMMARY

In one embodiment, a code tracking loop comprises a multipath discriminator configured to generate a first tracking error corresponding to a received signal in the presence of multipath interference and/or at low signal level. The code tracking loop also comprises a line-of-sight (LOS) discriminator configured to generate a second tracking error corresponding to the received signal. The code tracking loop further comprises a multipath switch to i) detect the presence of multipath interference in the received signal and/or a low signal level of the received signal compared to a threshold, and ii) indicate whether the first tracking error or the second tracking error is to be utilized.

In another embodiment, a method includes detecting whether multipath interference is present in a received signal and/or whether a received signal level is low compared to a threshold. Additionally, the method includes generating a tracking error corresponding to the received signal with a multipath discriminator when multipath interference in the received signal is detected and/or when the received signal level is low compared to the threshold. The method also includes generating the tracking error corresponding to the received signal with a line-of-sight (LOS) discriminator when multipath interference in the received signal is not detected and/or when the received signal level is high compared to the threshold.

In yet another embodiment, a timing error detector comprises a multipath discriminator configured to generate a first timing error corresponding to a received signal in the presence of multipath interference and/or at low signal level. The timing error detector also comprises a line-of-sight (LOS) discriminator configured to generate a second timing error corresponding to the received signal. Additionally, the timing error detector comprises a multipath switch to i) detect the presence of multipath interference in the received signal and/or a low signal level of the received signal compared to a threshold, and ii) indicate whether the first timing error or the second timing error is to be utilized.

DETAILED DESCRIPTION

Example timing error estimation methods and apparatus are described herein in the context of the Global Positioning System. It is noted, in light of the disclosure and teachings herein, that similar methods and apparatus are suitable to be utilized in other positioning systems as well, including global and regional positioning systems such as the Galileo system and the GLObal NAvigation Satellite System (GLONASS). It is also noted, in light of the disclosure and teachings herein, that similar methods and apparatus are suitable to be utilized in other communication systems such as communication systems that utilize code division multiplexing (CDM) or pulse in ultra wide bandwidth (UWB).

Figure 1:
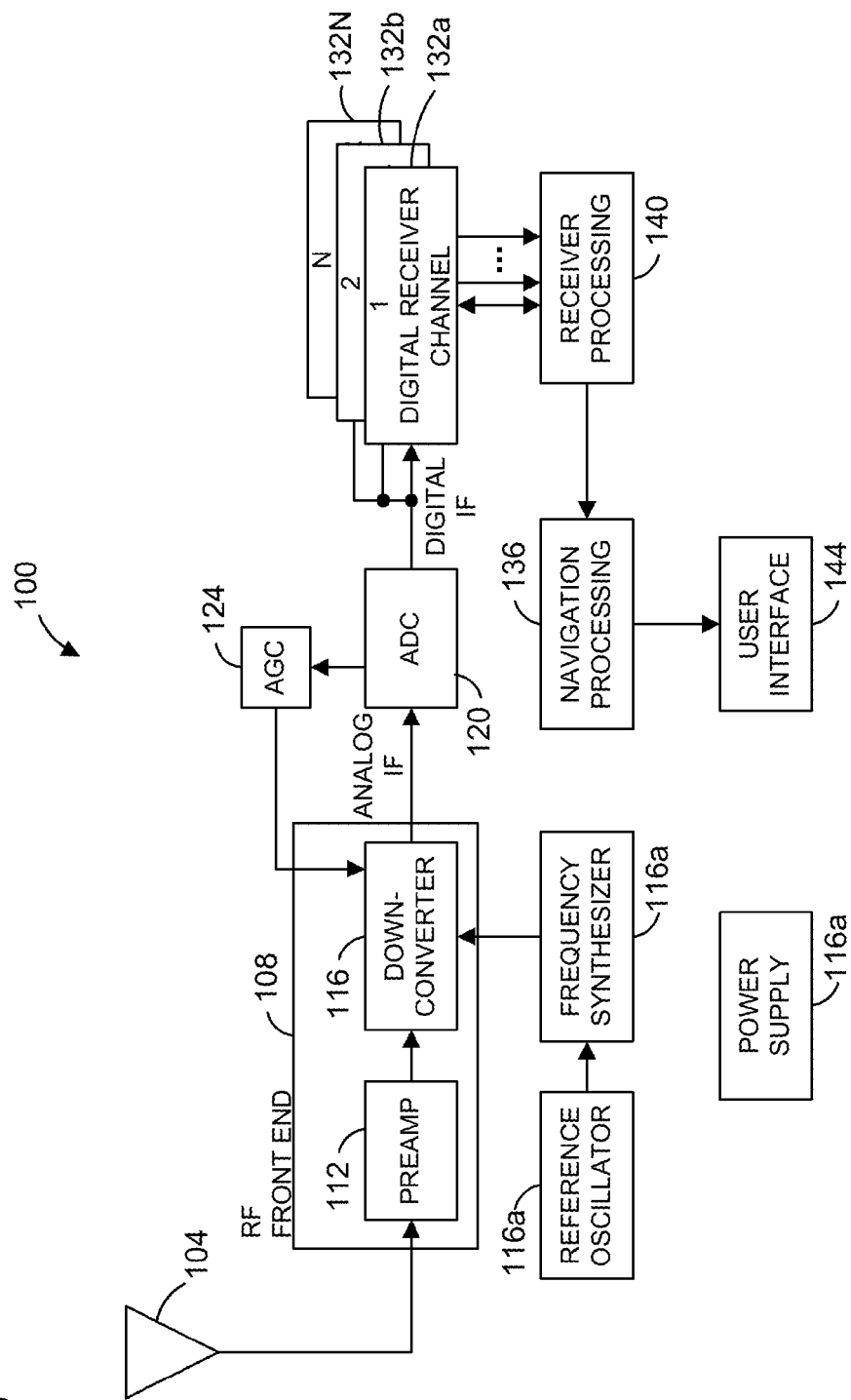
FIG. 1 is a block diagram of an example global positioning system (GPS) receiver, according to an embodiment.

FIG. 1 is a block diagram of an example GPS receiver 100, according to an embodiment. The receiver 100 includes an antenna coupled to a radio frequency (RF) front end unit 108 having a preamplifier 112 coupled to a down-converter 116. The down-converter 116 down converts a received RF signal from an RF to an intermediate frequency (IF) to generate an analog IF signal. An analog-to-digital converter (ADC) 120 is coupled to the RF front end unit 108 and converts the analog IF signal to a digital IF signal. An automatic gain control (AGC) unit 124 is coupled to the ADC 120 and receives an output of the ADC 120. The AGC unit 124 controls a variable gain unit in the down-converter 116 based on the output of the AGC unit 124.

A plurality of digital receiver units 132 are coupled to the ADC 120. Each receiver unit 132 is configured to demodulate a signal modulated by a pseudo-random noise (PRN) code corresponding to a respective GPS satellite. Thus, in an embodiment, each receiver unit 132 corresponds to a respective GPS satellite. In one embodiment, the receiver 100 includes at least four receiver units 132. In various different embodiments, the receiver 100 includes four, five, six, seven, eight, nine, ten, etc., receiver units 132. The plurality of digital receiver units 132 generate a plurality of digital signals corresponding to signals from a plurality of satellites. The plurality of digital signals is provided to a receiver processing unit 140.

Each digital receiver unit 132 includes a plurality of correlators for correlating a received signal against the respective PRN code and a plurality of delayed and advanced versions of the respective PRN code. A receiver processing unit 140 is coupled to the plurality of digital receiver units 132 and receives the outputs of the plurality of correlators. The receiver processing unit 140 utilizes the outputs of the correlators to generate various parameters such as a Doppler shift (frequency offset) and code phase error. Frequency offset is caused, at least in part, by a relative velocity between the satellite and the receiver 100. Code phase error is caused by a variety of factors including a change in the distance between the satellite and the receiver 100.

According to an embodiment, the receiver unit 132 and the receiver processing unit 140 implement a code tracking loop that utilizes a timing error detector having a line-of-sight (LOS) discriminator, i.e., a discriminator suitable and/or optimized for LOS code tracking and/or for high signal levels (e.g., high signal-to-noise ratios), and a multipath discriminator, i.e., a discriminator suitable and/or optimized for code tracking in multipath interference and/or for low signal levels (e.g., low signal-to-noise ratios).

The code tracking loop detects code phase error and utilizes the code phase error to adjust synchronization between a local reference signal and the received signal in an attempt to reduce the code phase error. According to an embodiment, the receiver unit 132 and the receiver processing unit 140 implement a carrier tracking loop that utilizes a carrier loop discriminator. The carrier tracking loop detects carrier offset and utilizes the carrier offset to adjust the frequency for down-conversion of the received signal to reduce the carrier offset.

The navigation processing unit 136 receives baseband signals corresponding to signals from a plurality of satellites and parameters generated by the receiver processing unit 140. The navigation processing unit 136 generates a position estimate and provides the position estimate to a user interface 144. In one embodiment, the navigation processing unit 136 generates a velocity estimate and provides the velocity estimate to the user interface 144. In another embodiment, the navigation processing unit 136 does not generate the velocity estimate.

Figure 2:
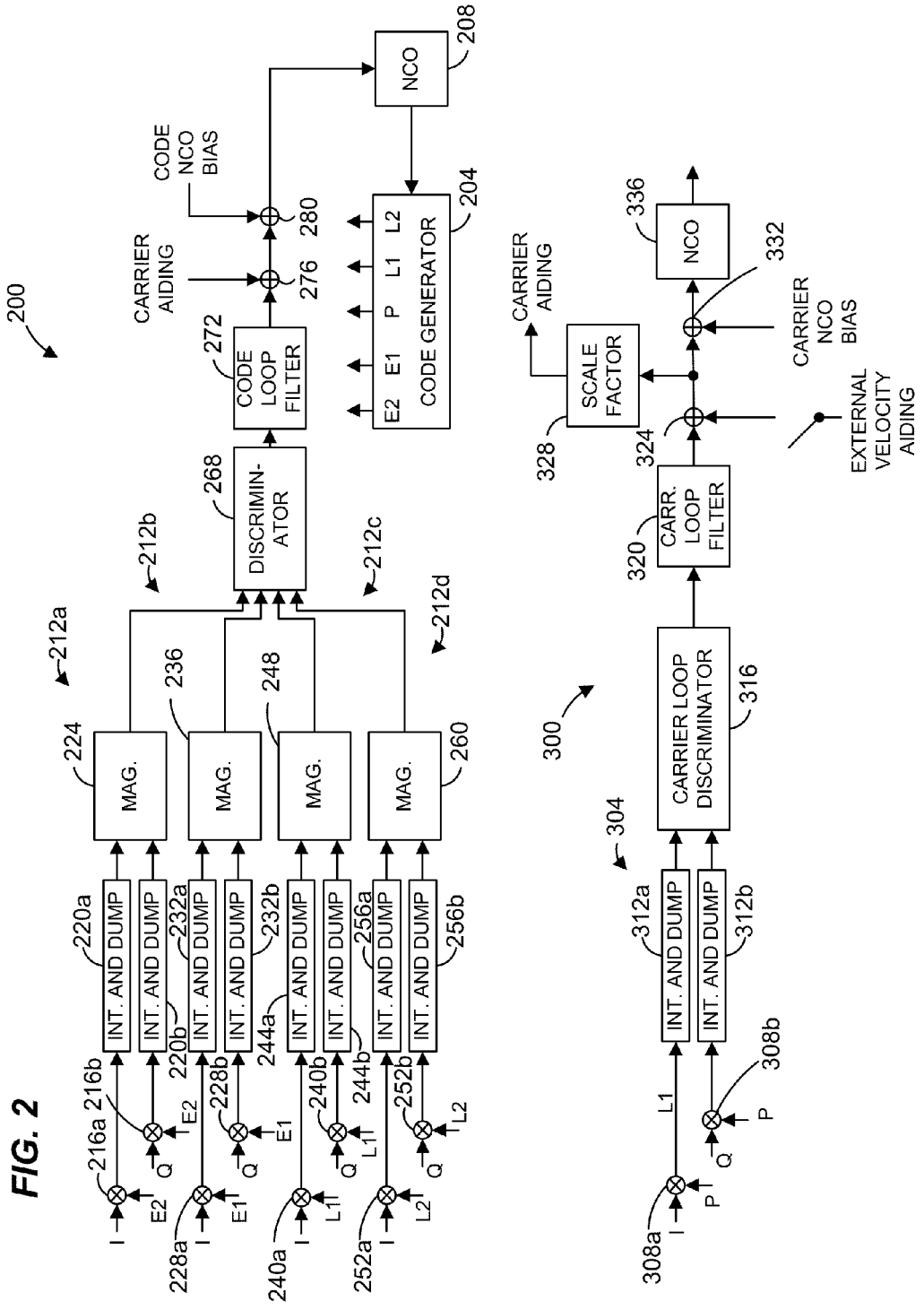
FIG. 2 is a block diagram of an example code tracking loop that is utilized in the GPS receiver of FIG. 1, according to an embodiment.

FIG. 2 is a block diagram of an example code tracking loop 200 that is implemented by the receiver unit 132 and the receiver processing unit 140 of FIG. 1, according to an embodiment. The code tracking loop 200 includes a code generator 204 that generates a plurality of versions of the PRN code corresponding to different delays or advancements of the PRN code in time. The code generator 204 generates a prompt (P) signal, which corresponds to an existing timing of the PRN code. The code generator 204 also generates a first early (E1) signal, which corresponds to an earlier arrival of the PRN code as compared to the P signal. The code generator 204 also generates a second early (E2) signal, which corresponds to an earlier arrival of the PRN code as compared to the E1 signal. The code generator 204 also generates a first late (L1) signal, which corresponds to a later arrival of the PRN code as compared to the P signal. The code generator 204 also generates a second late (L2) signal, which corresponds to a later arrival of the PRN code as compared to the L signal. Thus, in one embodiment, five versions of the PRN code signal are generated: E2, E1, P, L1, and L2. In an embodiment, the time spacing between adjacent signals is 0.1 chip, where one chip corresponds to one code phase of the PRN code. In other embodiments, different numbers of signals are generated and/or different spacings are utilized. For example, in one embodiment, three versions of the PRN code signal are generated: E, P, and L. In other embodiments, four, six, seven, eight, etc., versions of the PRN code signal are generated. In another embodiment, the time spacing between adjacent signals is 0.05 chip. In other embodiments, the spacing between adjacent signals is 0.2 chip, 0.5 chip. etc.

A numerically controlled oscillator (NCO) 208 is coupled to the code generator 204 and controls the timing of the signals generated by the code generator 204. As will be explained below, the code tracking loop 200 utilizes the NCO 208 to attempt to synchronize the P signal with the PRN signals received by the receiver.

The code tracking loop 200 includes a plurality of correlators 212. Correlator 212a correlates the received signal with the E2 signal, and correlator 212b correlates the received signal with the E1 signal. Similarly, correlator 212c correlates the received signal with the L1 signal, and correlator 212d correlates the received signal with the L2 signal. More specifically, the correlators 212 correlates the signals E2, E1, L1, and L2 with baseband I and Q signals, which correspond to the IF signal after down-conversion from IF to baseband and before despreading by the PRN code.

The correlator 212a includes multipliers 216, integrate and dump units 220, and a magnitude calculation unit 224. The multiplier 216a multiplies the I signal with the E2 signal. The integrate and dump unit 220a receives and accumulates the output of the multiplier 216a, resetting to zero at fixed times. The multiplier 216b multiplies the Q signal with the E2 signal, and the integrate and dump unit 220b receives and accumulates the output of the multiplier 216b, resetting to zero at fixed times. The magnitude calculation unit 224 calculates the magnitude of the pair of outputs of the integrate and dump units 220. In one embodiment, the magnitude calculation unit 224 calculates that magnitude as:

$$\text{Magnitude} = \sqrt{A^2 + B^2} \qquad \text{Equ. 1}$$

where A is the output of the integrate and dump unit 220a and B is the output of the integrate and dump unit 220b. In another embodiment, the magnitude calculation unit 224 calculates the magnitude as an approximation, utilizing a suitable approximation such as the Robertson approximation, the JPL approximation, etc. For instance, the Robertson approximation is:

$$\text{if } |A| \leq |B|, \text{Magnitude} = |B| + \frac{|A|}{2} \quad \text{Equ. 2a}$$

$$\text{if } |A| > |B|, \text{Magnitude} = |A| + \frac{|B|}{2} \quad \text{Equ. 2b}$$

The JPL approximation is:

$$\text{if } X \geq 3Y, \text{Magnitude} = X + \frac{Y}{8} \quad \text{Equ. 3a}$$

$$\text{if } X < 3Y, \text{Magnitude} = \frac{7X}{8} + \frac{Y}{2} \quad \text{Equ. 3b}$$

where X is Max(|A|,|B|) and Y is Min(|A|,|B|).

The correlator 212b includes multipliers 228, integrate and dump units 232, and a magnitude calculation unit 236. The multiplier 228a multiplies the I signal with the E1 signal. The integrate and dump unit 232a receives and accumulates the output of the multiplier 228a, resetting to zero at fixed times. The multiplier 228b multiplies the Q signal with the E1 signal, and the integrate and dump unit 232b receives and accumulates the output of the multiplier 228b, resetting to zero at fixed times. The magnitude calculation unit 236 calculates the magnitude of the pair of outputs of the integrate and dump units 232.

The correlator 212c includes multipliers 240, integrate and dump units 244, and a magnitude calculation unit 248. The multiplier 240a multiplies the I signal with the L1 signal. The integrate and dump unit 244a receives and accumulates the output of the multiplier 240a, resetting to zero at fixed times. The multiplier 240b multiplies the Q signal with the L1 signal, and the integrate and dump unit 244b receives and accumulates the output of the multiplier 240b, resetting to zero at fixed times. The magnitude calculation unit 248 calculates the magnitude of the pair of outputs of the integrate and dump units 244.

The correlator 212d includes multipliers 252, integrate and dump units 256, and a magnitude calculation unit 260. The multiplier 252a multiplies the I signal with the L2 signal. The integrate and dump unit 256a receives and accumulates the output of the multiplier 252a, resetting to zero at fixed times. The multiplier 252b multiplies the Q signal with the L2 signal, and the integrate and dump unit 256b receives and accumulates the output of the multiplier 252b, resetting to zero at fixed times. The magnitude calculation unit 260 calculates the magnitude of the pair of outputs of the integrate and dump units 256.

A discriminator 268 is coupled to the magnitude calculation units 224, 236, 248, 260, and generates a code phase error based on the outputs of the magnitude calculation units 224, 236, 248, 260. The discriminator 268 includes a discriminator system that includes a LOS discriminator and a multipath discriminator, which will be described in more detail below. In an embodiment, the LOS discriminator comprises a conventional early-prompt-late (EPL) error detector. In an embodiment, the multipath discriminator comprises a multipath discriminator such as described in U.S. patent application Ser. No. 12/785,822, entitled "Timing Error Detector for Adverse Channel Conditions," filed on May 24, 2010, which is hereby incorporated by reference herein in its entirety.

A code loop filter 272 filters the code phase error, and adders 276 and 280 add a carrier aiding signal and a bias value. The bias value is for setting a frequency of the NCO 208 to the actual PRN chip rate, which is subject to Doppler shift. The carrier aiding signal is a signal generated by a carrier tracking loop 300 and that corresponds to a Doppler shift.

The output of the adder 280 is coupled to the NCO 208, which adjusts the frequency of the NCO 208 output based on the output of the adder 280.

The carrier tracking loop 300 includes a correlator 304, which correlates the baseband I and Q signals with the P signal. The correlator 304 correlates the P signal with baseband I and Q signals, which correspond to the IF signal after down-conversion from IF to baseband and before despreading by the PRN code. The correlator 304 includes multipliers 308, integrate and dump units 312. The multiplier 308a multiplies the I signal with the P signal. The integrate and dump unit 312a receives and accumulates the output of the multiplier 308a, resetting to zero at fixed times. The multiplier 308b multiplies the Q signal with the P signal, and the integrate and dump unit 312b receives and accumulates the output of the multiplier 308b, resetting to zero at fixed times.

A discriminator 316 calculates estimates of the carrier offset, and a carrier loop filter 320 filters the estimates. An adder 324 adds an external velocity aiding signal and a multiplier 328 multiplies a scaling factor to the output of the adder 324 to generate the carrier aiding signal. An adder 332 adds a bias signal and the output of the adder 332 is provided to a carrier NCO 336. The output of the carrier NCO 336 is utilized to control synthesizers for demodulating the I and Q signals from IF.

In one embodiment, the carrier aiding signal is not generated and the adder 276 and the multiplier 328 are omitted.

Figure 3:
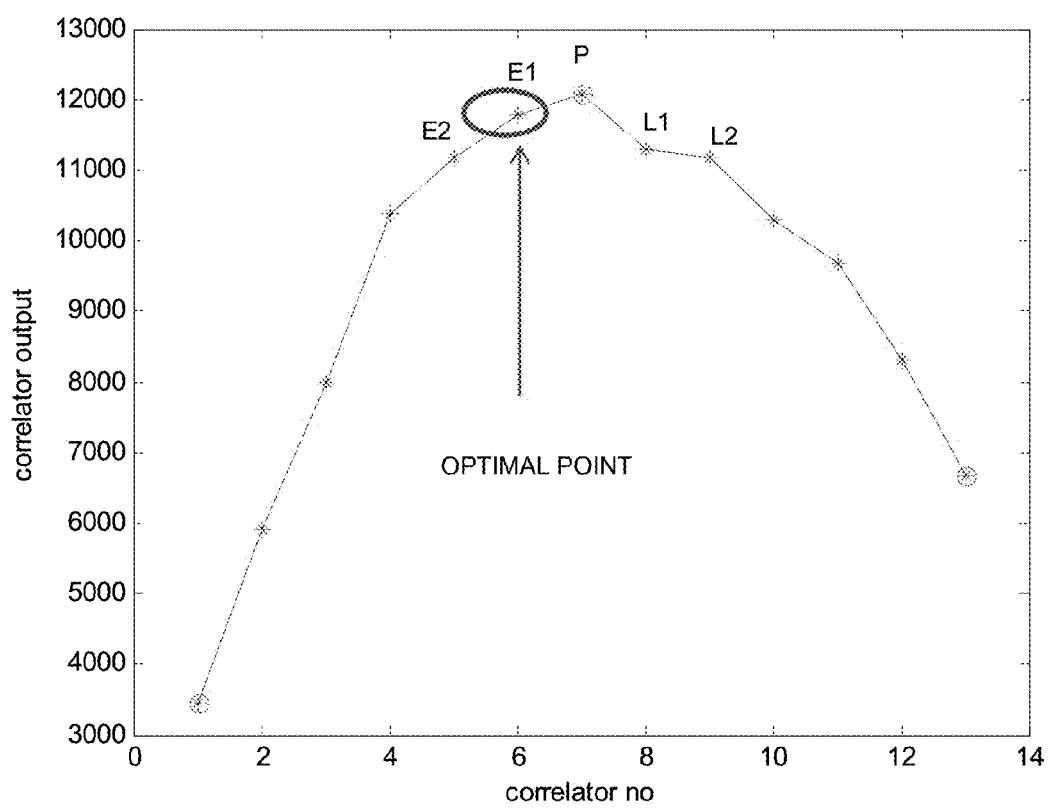
FIG. 3 is a plot of an example correlation function corresponding to a multipath interference scenario.

In an embodiment, the discriminator 268 chooses an optimal correlation point that corresponds to an output of one of the magnitude calculation units 224, 236, 248, 260. For example, in one embodiment, the discriminator 268 chooses an optimal correlation point that corresponds to one of the magnitude calculation units 224, 236, 248, 260 that has an output greater than the outputs of the other magnitude calculation units 224, 236, 248, 260 (i.e., the magnitude calculation unit 224, 236, 248, or 260 with the maximum output). FIG. 3 is a plot of an example correlation function corresponding to a multipath interference scenario in which the signals E2, E1, P, L1 and L2 have a spacing of 0.1 chips. Correlation points corresponding to E2, E1, P, L1 and L2 are illustrated, where the outputs of the magnitude calculation units 224, 236, 248, 260 correspond to points E2, E1, L1 and L2, respectively. In the example correlation function of FIG. 3, the magnitude calculation unit 224, 236, 248, 260 having the highest output is calculation unit 236, corresponding to E1. Thus, in this scenario, the discriminator 268 will generate an error corresponding to E1 with respect to P. For example, if 0.1 chip spacing is utilized, the generated error corresponds to +0.1 chip.

Figure 4:
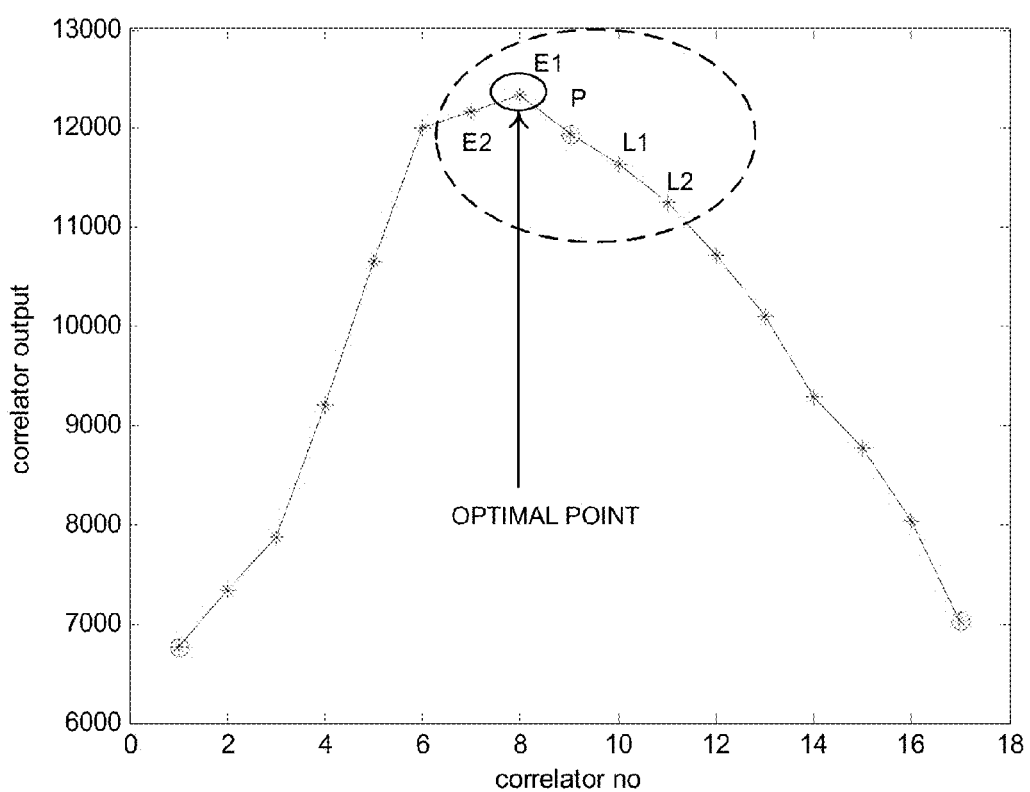
FIG. 4 is a plot of another example correlation function corresponding to another multipath interference scenario.

In another embodiment, the discriminator 268 also utilizes a correlation corresponding to the P signal. In this embodiment, an additional magnitude calculator is included to calculate a P magnitude signal based on the outputs of the correlator. FIG. 4 is a plot of an example correlation function corresponding to a multipath interference scenario in which the signals E2, E1, P, L1 and L2 have a spacing of 0.1 chips. Correlation points corresponding to E2, E1, P, L1 and L2 are illustrated, where the outputs of the magnitude calculation units 224, 236, 248, 260 correspond to points E2, E1, L1 and L2, respectively, and an additional magnitude calculation unit calculates the point P. In the example correlation function of FIG. 4, the magnitude calculation unit (including the additional magnitude calculation unit for P) having the highest output is calculation unit 236, corresponding to E1. Thus, in this scenario, the discriminator 268 will generate an error corresponding to E1. For example, if 0.1 chip spacing is utilized, the generated error corresponds to +0.1 chip.

In another embodiment, the discriminator 268 calculates an error based on fitting a curve to the outputs of the magnitude calculation units 224, 236, 248, 260. In one embodiment in which the additional magnitude calculator is included to calculate the P magnitude signal, the discriminator 268 calculates an error based on fitting a curve to the outputs of the magnitude calculation units 224, 236, 248, 260 and the output of the calculation unit corresponding to the P signal.

In some embodiments that utilize curve fitting, the optimal correlation point is determined as the point at which a maximum occurs on the curve.

Figure 5:
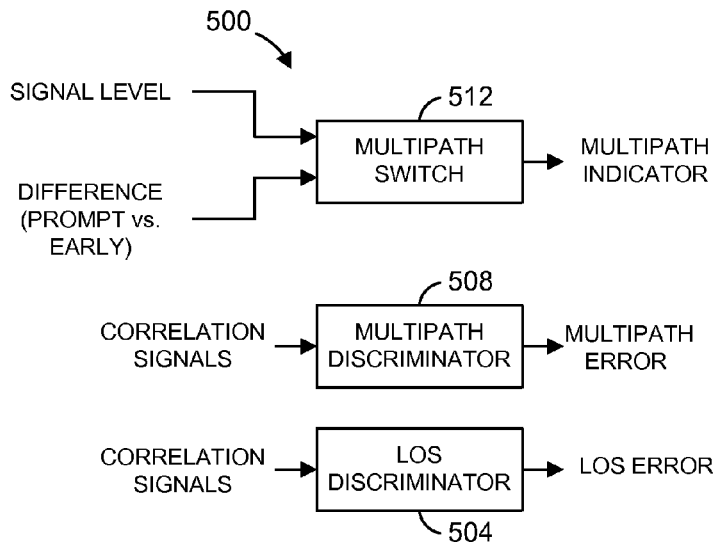
FIG. 5 is a block diagram of an example code loop tracking discriminator system that can be utilized with the GPS receiver of FIG. 1, according to an embodiment.

FIG. 5 is a block diagram of an example code loop tracking discriminator system 500, according to an embodiment. The discriminator system 500 is utilized in the discriminator 268 of FIG. 2, in an embodiment. In other embodiments, the discriminator system 500 is utilized in other systems.

The discriminator system 500 includes a line-of-sight (LOS) discriminator 504, i.e., a discriminator suitable and/or optimized for LOS code tracking and/or for high signal levels (e.g., high signal-to-noise ratios). In one embodiment, the LOS discriminator 504 comprises a conventional early-prompt-late (EPL) error detector. For example, the EPL error detector utilizes three correlators to generate an early signal, a prompt signal, and a late signal with a spacing between the early signal and the late signal corresponding to one half chip. In various embodiments, the LOS discriminator 504 may comprise a quasi-coherent discriminator, a coherent discriminator, a non-coherent discriminator or any other suitable discriminator. The LOS discriminator 504 generates a corresponding error signal.

The discriminator system 500 also includes a multipath discriminator 508, i.e., a discriminator suitable and/or optimized for code tracking in multipath interference and/or for low signal levels (e.g., low signal-to-noise ratios). In one embodiment, the multipath discriminator 508 comprises a discriminator such as described in U.S. patent application Ser. No. 12/785,822, and in this embodiment, the multipath discriminator 508 utilizes a suitable number of correlators to generate suitable correlation signals. In one embodiment, the spacing between two adjacent correlation signals is at least 0.1 chip.

In various other embodiments, the multipath discriminator 508 comprises a discriminator different than described in U.S. patent application Ser. No. 12/785,822, but suitable for code tracking in multipath interference and/or for low signal levels (e.g., low signal-to-noise ratios). In these embodiments, a suitable number of correlators generate suitable correlation signals for the multipath discriminator 508. In some embodiments, the spacing between two adjacent correlation signals is 0.5 chip or less. In some embodiments, the multipath discriminator 508 utilizes non-linear models (e.g., 2nd-order models or other interpolation curves) to estimate the peak of a correlation function, which is corresponding to the first-arrived signal component.

The discriminator system 500 also includes a multipath and/or low signal level switch 512 (hereinafter referred to as "the multipath switch 512" for ease of explanation). The multipath switch 512 detects the presence of multipath interference and/or low signal levels. In one embodiment, the multipath switch 512 includes a signal level measurement unit or receives a signal from a signal level measurement unit, the signal providing an estimate of the signal level, a signal-to-noise ratio, a carrier-to-noise ratio, etc. If the signal indicates a level over a threshold (e.g., a signal level of −140 dBm or any other suitable threshold that indicates a low signal level), the multipath switch 512 generates a signal to indicate that the code tracking loop should utilize the error signal generated by the LOS discriminator 504. If the signal indicates a level less than or equal to the threshold, the multipath switch 512 generates a signal to indicate that the code tracking loop should utilize the error signal generated by the multipath discriminator 504.

In another embodiment, the multipath switch 512 additionally or alternatively includes a detector or receives signal from a detector, the signal providing an indication of the difference between the correlation outputs corresponding to the prompt signal and an early signal for the LOS discriminator 504. In one embodiment, the difference signal is generated by the LOS discriminator 504. If the signal indicates a level over a suitable threshold, the multipath switch 512 generates a signal to indicate that the code tracking loop should utilize the error signal generated by the LOS discriminator 504. If the signal indicates a level less than or equal to the threshold, the multipath switch 512 generates a signal to indicate that the code tracking loop should utilize the error signal generated by the multipath discriminator 504.

Figure 6:
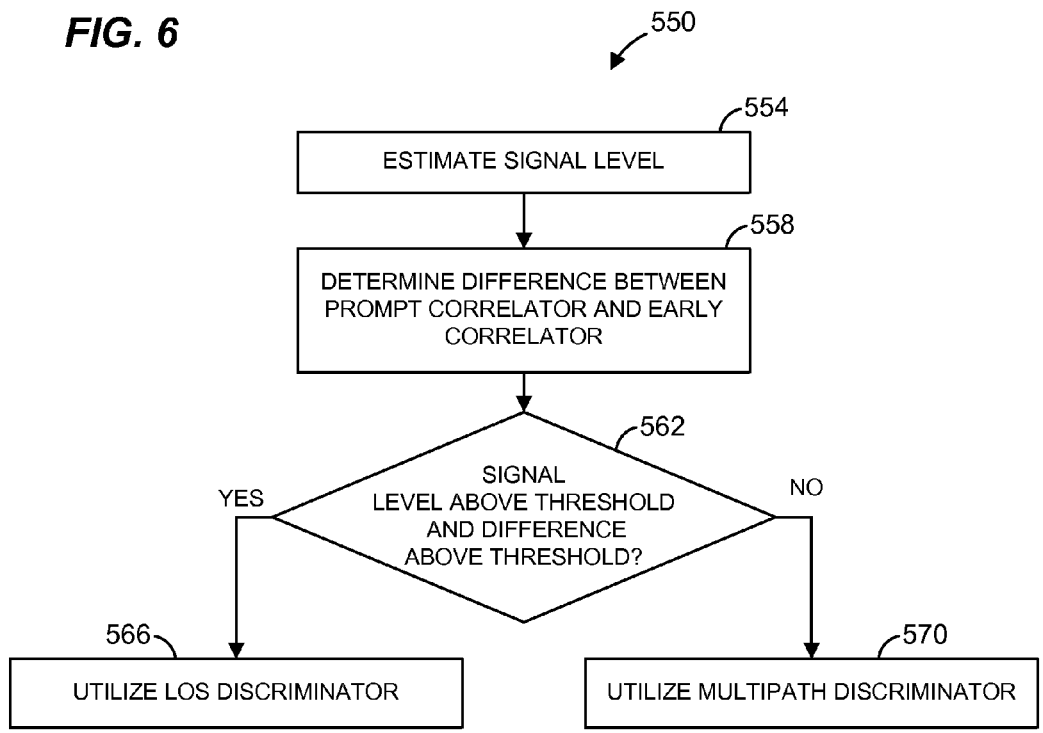
FIG. 6 is a flow diagram of an example method implemented by a code tracking discriminator system, according to an embodiment.

FIG. 6 is a flow diagram of an example method 550 for code tracking, according to an embodiment. The method 550 is implemented by the discriminator system 500 of FIG. 5, in one embodiment, and the method 550 will be described with reference to FIG. 5 for ease of explanation. In another embodiment, however, the discriminator system 500 implements another suitable method.

At block 554, an estimate of a signal level is generated. The estimate corresponds to a signal-to-noise ratio, a carrier-to-noise ratio, or any other suitable signal level measurement. The estimate is generated by a suitable signal level measurement unit.

At block 558, a difference between a correlation output corresponding to the prompt signal and a correlation output corresponding to an early signal is generated. In one embodiment, the spacing between the prompt signal and the early signal is 0.5 chip. In other embodiments, other suitable spacings are utilized. In one embodiment, the difference is generated by the LOS discriminator 504. In another embodiment, the multipath switch 512 receives an output of a prompt correlator and an output of an early correlator and generates the difference.

At block 562, it is determined whether the estimate generated at block 554 is greater than a first threshold, and it is determined whether the difference generated at block 558 is greater than a second threshold. If the estimate generated at block 554 is greater than the first threshold and the difference generated at block 558 is greater than the second threshold, the flow proceeds to block 566. At block 566, the code tracking loop utilizes the output of the LOS discriminator 504. On the other hand, if at block 562 it is determined that the estimate generated at block 554 is not greater than the first threshold and/or the difference generated at block 558 is not greater than the second threshold, the flow proceeds to block 570. At block 570, the code tracking loop utilizes the output of the multipath discriminator 508.

In another embodiment, block 554 is omitted and at block 562 it is determined whether the difference generated at block 558 is greater than a threshold. In another embodiment, the block 558 is omitted and at block 562 it is determined whether the estimate generated at block 554 is greater than a threshold.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. An apparatus, comprising:
a multipath discriminator configured to generate a first tracking error that estimates a phase difference between a received signal and a local reference signal, and that corresponds to the received signal (i) in the presence of multipath interference and/or (ii) at low signal level;
a line-of-sight (LOS) discriminator configured to generate a second tracking error that estimates the phase difference between the received signal and the local reference signal;
a multipath switch configured to:
detect (i) a presence of multipath interference in the received signal and/or (ii) a low signal level of the received signal as compared to a threshold, and
indicate whether either (i) the first tracking error is to be utilized or (ii) the second tracking error is to be utilized;
a code tracking loop configured to utilize the first tracking error or the second tracking error, as indicated by the multipath switch, to adjust the synchronization between the local reference signal and the received signal in an attempt to reduce code phase error; and
a plurality of correlators configured to correlate the received signal with a plurality of delayed versions of the local reference signal, the plurality of correlators generating at least an early correlation signal and a prompt correlation signal.

2. An apparatus according to claim 1, wherein the multipath switch is configured to i) compare a signal level measurement for the received signal to the threshold, and ii) detect the presence of multipath interference based on the comparison.

3. An apparatus according to claim 1, wherein the multipath switch is configured to i) compare a difference between the prompt correlation signal and the early correlation signal to another threshold, and ii) detect the presence of multipath interference based on the comparison.

4. An apparatus according to claim 1,
wherein the multipath discriminator includes a tracking error detector configured to i) choose an optimal correlation point based on a set of correlation points that excludes a current optimal point corresponding to zero tracking error, and ii) determine the first tracking error based on the chosen optimal correlation point.

5. An apparatus according to claim 4, wherein the tracking error detector is configured to choose the optimal correlation point corresponding to one of the plurality of correlators with a highest output as compared to outputs of the others of the plurality of correlators.

6. An apparatus according to claim 1, wherein the LOS discriminator comprises an early-prompt-late (EPL) error detector.

7. A method, comprising:
detecting (i) whether multipath interference is present in a received signal and/or (ii) whether a signal level of the received signal is low as compared to a threshold;
correlating the received signal with a plurality of delayed versions of a local reference signal to generate at least an early correlation signal and a prompt correlation signal:
generating, with a multipath discriminator, a first tracking error that estimates a phase difference between the received signal and the local reference signal when (i) multipath interference in the received signal is detected and/or (ii) when the signal level of the received signal is low as compared to the threshold;
generating, with a line-of-sight (LOS) discriminator, a second tracking error that estimates a phase difference between the received signal and the local reference signal when (i) multipath interference in the received signal is not detected and/or when (ii) the signal level of the received signal is high as compared to the threshold; and
utilizing the first tracking error or the second tracking error to adjust synchronization between the local reference signal and the received signal in an attempt to reduce code phase error based on at least one of (i) whether multipath interference in the received signal is detected, and/or (ii) whether the signal level of the received signal is low as compared to the threshold.

8. A method according to claim 7, wherein detecting whether multipath interference is present in the received signal comprises comparing a signal level measurement for the received signal to the threshold.

9. A method according to claim 7,
wherein detecting whether multipath interference is present in the received signal comprises comparing a difference between the prompt correlation signal and the early correlation signal to a threshold.

10. A method according to claim 7,
wherein generating the first tracking error with the multipath discriminator comprises:
choosing an optimal correlation point based on a set of correlation points that excludes a current optimal point corresponding zero tracking error, and
determining the first tracking error based on the chosen optimal correlation point.

11. A method according to claim 10, wherein choosing the optimal correlation point comprises choosing one of a plurality of correlators with a highest output as compared to outputs of others of the plurality of correlators.

12. A method according to claim 7, wherein generating the second tracking error with the LOS discriminator comprises generating the tracking error with an early-prompt-late (EPL) error detector.

13. An apparatus, comprising:
a multipath discriminator configured to generate a first timing error that estimates a phase difference between a received signal and a local reference signal, and that corresponds to the received signal (i) in the presence of multipath interference and/or (ii) at low signal level;
a line-of-sight (LOS) discriminator configured to generate a second timing error that estimates the phase difference between the received signal and the local reference signal;
a multipath switch configured to:
detect (i) a presence of multipath interference in the received signal and/or (ii) a low signal level of the received signal as compared to a threshold, and
indicate whether the first timing error or the second timing error is to be utilized; and
a code tracking loop configured to utilize the first timing error or the second timing error, as indicated by the multipath switch, to adjust the synchronization between the local reference signal and the received signal in an attempt to reduce code phase error; and
a plurality of correlators configured to correlate the received signal with a plurality of delayed versions of the local reference signal, the plurality of correlators generating at least an early correlation signal and a prompt correlation signal.

14. An apparatus according to claim 13, wherein the multipath switch is configured to compare a signal level measurement for the received signal to the threshold and to detect the presence of multipath interference based on the comparison.

15. An apparatus according to claim 13, wherein the multipath switch is configured to i) compare a difference between the prompt correlation signal and the early correlation signal to a threshold, and ii) detect the presence of multipath interference based on the comparison.

16. An apparatus according to claim 13,
wherein the multipath discriminator includes an error detector configured to i) choose an optimal correlation point based on a set of correlation points that excludes a current optimal point corresponding zero tracking error, and ii) determine the tracking error based on the chosen optimal correlation point.

17. An apparatus according to claim 16, wherein the tracking error detector is configured to choose the optimal correlation point corresponding to one of the plurality of correlators with a highest output as compared to outputs of the others of the plurality of correlators.

18. An apparatus according to claim 13, wherein the LOS discriminator comprises an early-prompt-late (EPL) error detector.

* * * * *